United States Patent [19]
Parra

[11] Patent Number: 5,998,941
[45] Date of Patent: Dec. 7, 1999

[54] LOW-VOLTAGE HIGH-EFFICIENCY FLUORESCENT SIGNAGE, PARTICULARLY EXIT SIGN

[76] Inventor: Jorge M. Parra, 5210 Sycamore Dr., New Port Richey, Fla. 34654

[21] Appl. No.: 08/915,696

[22] Filed: Aug. 21, 1997

[51] Int. Cl.⁶ .................................................. G05F 1/00
[52] U.S. Cl. ..................... 315/307; 315/209 R; 315/254; 323/252
[58] Field of Search .................................. 315/307, 244, 315/209 R, 254, 207; 362/219, 222, 224, 362, 812; 323/222, 282

[56] References Cited

U.S. PATENT DOCUMENTS

| | | | |
|---|---|---|---|
| Re. 33,057 | 9/1989 | Clegg et al. | 315/224 |
| 1,963,963 | 6/1934 | Barclay | 176/124 |
| 2,139,815 | 12/1938 | Fodor | 40/130 |
| 3,235,771 | 2/1966 | Schwartz | 315/312 |
| 3,801,865 | 4/1974 | Roberts | 315/276 |
| 3,975,660 | 8/1976 | Knobel et al. | 315/102 |
| 4,005,330 | 1/1977 | Glascock, Jr. et al. | 315/57 |
| 4,010,400 | 3/1977 | Hollister | 315/248 |
| 4,189,661 | 2/1980 | Haugsjaa et al. | 315/39 |
| 4,196,374 | 4/1980 | Witting | 315/58 |
| 4,266,167 | 5/1981 | Proud et al. | 315/248 |
| 4,373,146 | 2/1983 | Bonazoli et al. | 315/209 R |
| 4,410,930 | 10/1983 | Yachabach | 362/145 |
| 4,420,898 | 12/1983 | Moses | 40/570 |
| 4,427,923 | 1/1984 | Proud et al. | 315/248 |
| 4,544,863 | 10/1985 | Hashimoto | 315/209 R |
| 4,587,600 | 4/1986 | Morten | 362/219 |
| 4,613,795 | 9/1986 | Itani et al. | 315/DIG. 7 |
| 4,630,005 | 12/1986 | Clegg et al. | 331/113 A |
| 4,650,265 | 3/1987 | Holtzman | 339/1 L |
| 4,782,268 | 11/1988 | Fähnrich et al. | 315/200 R |
| 4,798,997 | 1/1989 | Egami et al. | 315/115 |
| 4,808,887 | 2/1989 | Fähnrich et al. | 315/247 |
| 4,857,806 | 8/1989 | Nilssen | 315/72 |
| 4,920,299 | 4/1990 | Presz et al. | 315/98 |
| 4,949,013 | 8/1990 | Zuchtriegel | 315/106 |
| 4,959,591 | 9/1990 | Hirschmann | 315/209 R |
| 4,973,885 | 11/1990 | Kerwin | 315/219 |
| 5,043,627 | 8/1991 | Fox | 313/491 |
| 5,300,860 | 4/1994 | Godyak et al. | 315/39 |
| 5,325,024 | 6/1994 | Piejak et al. | 315/248 |
| 5,349,270 | 9/1994 | Roll et al. | 315/209 R |
| 5,359,263 | 10/1994 | Roberts | 315/58 |
| 5,381,073 | 1/1995 | Godyak et al. | 315/58 |
| 5,408,162 | 4/1995 | Williams | 315/224 |
| 5,461,286 | 10/1995 | Hirschmann | 215/205 |
| 5,512,801 | 4/1996 | Nilssen | 315/209 R |
| 5,521,467 | 5/1996 | Statnic et al. | 315/247 |
| 5,526,251 | 6/1996 | Andre et al. | 362/396 |
| 5,548,189 | 8/1996 | Williams | 315/224 |
| 5,578,907 | 11/1996 | Tao et al. | 315/247 |
| 5,581,161 | 12/1996 | Gong | 315/307 |
| 5,611,163 | 3/1997 | Smith | 40/570 |
| 5,656,925 | 8/1997 | Schie et al. | 323/222 |
| 5,677,602 | 10/1997 | Paul et al. | 315/224 |
| 5,710,487 | 1/1998 | Valcke | 315/205 |

OTHER PUBLICATIONS

Peter N. Wood and Gerry Limjuco, "Simple Electronic Ballast Using IR2155 MOS Gate Driver", *International Rectifier Publication Application Notes*, No. DT 94–3, pp. 1–11. (Best available copy).

Peter N. Wood, "Electronic Ballasts Using the Cost–Saving IR2155 Driver", *International Rectifier Publication Application Notes*, No. AN–995, pp. 1–3.

*Primary Examiner*—Haissa Philogene
*Attorney, Agent, or Firm*—Jim Zegeer

[57] ABSTRACT

An "exit" sign lighting system comprising, in combination a housing having the word EXIT formed in an opening wall thereof, a translucent member in said opening, a gas discharge device, such as a fluorescent tube is driven from a source of a low-voltage, high-frequency square wave voltage having a pair of output terminals and an LC free circuit connecting the low-voltage, high-frequency square wave voltage to the gas discharge device to non-thermionically excite and illuminate the gas discharge device, and thereby illuminate the translucent member and the word EXIT. The low voltage is from about 2 volts to about 90 volts and the frequency is from about 75 kHz to about 3.5 MHz.

7 Claims, 3 Drawing Sheets

LOW-VOLTAGE HIGH-EFFICIENCY FLUORESCENT SIGNAGE, PARTICULARLY EXIT SIGN

The present invention is related to my provisional application Ser. No. 60/053,796 filed Jul. 25, 1997 entitled LOW-VOLTAGE, NON-THERMIONIC, BALLASTFREE FLUORESCENT LIGHT SYSTEM AND METHOD, which is incorporated herein by reference.

BACKGROUND AND BRIEF DESCRIPTION OF THE INVENTION

Exit signs are located in theaters, public buildings, high-rise apartment buildings, and the like for purposes of guiding people safely to exit stairways and exit doorways and the like from these such structures in times of emergency. Normally, they use incandescent lamps which generate large amounts of heat thereby shortening the life of the light source and requiring considerable maintenance and expense. Moreover, since these exit signs are located in buildings which require that they be on in times of emergency and highly visible, possibly through smoke and haze, they require a backup electrical power source in the event of failure of the main power line, such as a conventional 110 volt main. Such prior art systems also may require the alternative lamps or low-voltage lamps which turn on in the event of failure of the main power supply. See FIG. 1 and U.S. Pat. Nos. 5,611,163 and 5,526,251. There have been efforts to incorporate fluorescent lamps into exit signs. See U.S. Pat. Nos. 4,587,600 and 4,650,265 as examples.

The object of the invention is to provide a new and improved ballastless, non-thermionic and starterless fluorescent exit sign which works on inducing oscillation on the gas contained in the tube at a frequency which is related to the type of gas to obtain maximum luminosity without the presence of a carrier, consumes little electrical energy (2.6 watts) and which is dimmable without flickering regardless of the level of luminosity and in which the light spectrum is constant.

Another object of the invention is to provide an improved exit sign which is low in cost and low in energy consumption.

The exit sign of the present invention incorporates a ballast-free, starter-free, non-thermionic conventional fluorescent lamp or tube driven by a high-frequency square wave driver circuit.

Another object of the invention is to provide a low voltage (under 85–90 volts), non-thermionic, ballast-free, fluorescent lighting system for exit signs.

According to the invention at least one gas discharge lighting lamp or tube (which may be constituted by UV-responsive phosphor-coated envelope confining a gaseous discharge medium at a predetermined pressure between a pair of electrodes) is mounted in an "exit" sign housing and non-thermionically driven by a low-voltage square wave power supply. The square wave power supply may incorporate a solid state switch which is operated to generate a substantially square wave alternating current wave at the lamp or tube electrodes such that the voltage supplied to the electrodes reverses polarity more rapidly than the pattern of electron and ion density in the tube can shift so that electrons throughout the length of the tube are continually accelerated and will, through several cycles of said square wave, create free electrons and ions throughout the tube's volume, in steady state operation and illuminate the fluorescent lighting lamp. The frequency of oscillation is preferably related to the type of gas to obtain maximum luminosity without the presence of a carrier. The current in the tube is minimal and no noticeable level of RFs are present, that is, there is substantially no radio interference.

The oscillating transformer in the present invention provides a level of luminosity which is a function of the voltage thereby making dimming of the fluorescent lamp possible without flickering (90% dimming) regardless of the level of luminosity. The band on the spectrum is constant and reflects the initial reaction to the oscillation. The system works in any type of gas filled envelope.

Thus, there is disclosed a sign lighting system comprising a housing having signage indicia in a wall thereof. A fluorescent gas discharge lamp is mounted inside the housing and a source of low-voltage high-frequency square wave voltage having a pair of output terminals and an LC-free circuit connecting the low-voltage, high-frequency, square wave voltage to the fluorescent gas discharge lamp to non-thermionically excite the fluorescent member and the indicia formed on the wall of the housing.

In a preferred exit sign system, a 7.2 volt DC rechargeable battery is used. The battery backup has a battery charging circuit and uses a 7.2 volt nicad rechargeable battery. The fluorescent tube is an FT6 fluorescent tube with no starter or ballast and the filaments are not connected to a source of heater current. The light output in such a lamp is bright and the battery good for three hours (when only ninety minutes are required by federal regulations). The exit sign uses 2.6 watts of energy (in comparison to the standard sign on the market uses 50 watts). The display is green which corresponds to the new spec for LED equipped signs in the market which are only red. The cost of manufacturing is much lower than the standard sign on the market.

In one preferred embodiment, the driver circuit of the present invention includes an oscillating transformer having a primary and secondary winding with the primary winding center tapped and coupled to the toggle or gate electrode of a switching diode. A supply of direct current such as a low-voltage battery is applied through a electrolytic filter capacitor and a 1500 ohm resistor bypassed by a capacitor. A third capacitor shunts the switching diode. The circuit operates to provide 3.9 megahertz square waves output on the secondary at 1.4 volts to a fluorescent tube such as FT6. An AC supply is rectified and used to supply the driver circuit. A charging circuit for a battery is connected to the AC supply. Upon failure of the AC supply, the battery automatically supplies DC voltage to the driver circuit.

DESCRIPTION OF THE DRAWINGS

The above and other objects, advantages and features of the invention will become more apparent when considered with the following specification and accompanying drawings wherein.

DETAILED DESCRIPTION OF THE INVENTION

The system of the present invention uses a square wave AC inverter circuit to drive the electrodes of a fluorescent tube mounted in an exit sign. The square wave alternating current wave at the tube electrodes is such as to reverse polarity more rapidly than the pattern of electron and ion density in the tube can shift so that electrons throughout the tube are continuously accelerated and will, through several cycles of the square wave create free electrons and ions throughout the gas tube's volume, in steady state operation and illuminate the exit sign's fluorescent lighting lamp. The frequency of oscillation can be related to the type of gas to obtain maximum luminosity without the presence of a carrier. The current on the tube is minimal so when operating from the battery, there is low drainage and long time of operation when there is a power outage, and there is no noticeable level of RF present so there is little or no radio interference. The present invention uses an oscillation transformer, and the level of luminosity is a function of the voltage making dimming of the fluorescent lamp possible without flickering (90% dimming) regardless of the level of luminosity. The band on the light spectrum is constant and reflects the initial reaction to the oscillation. The system works in any type of gas-filled envelope.

Figure 1:
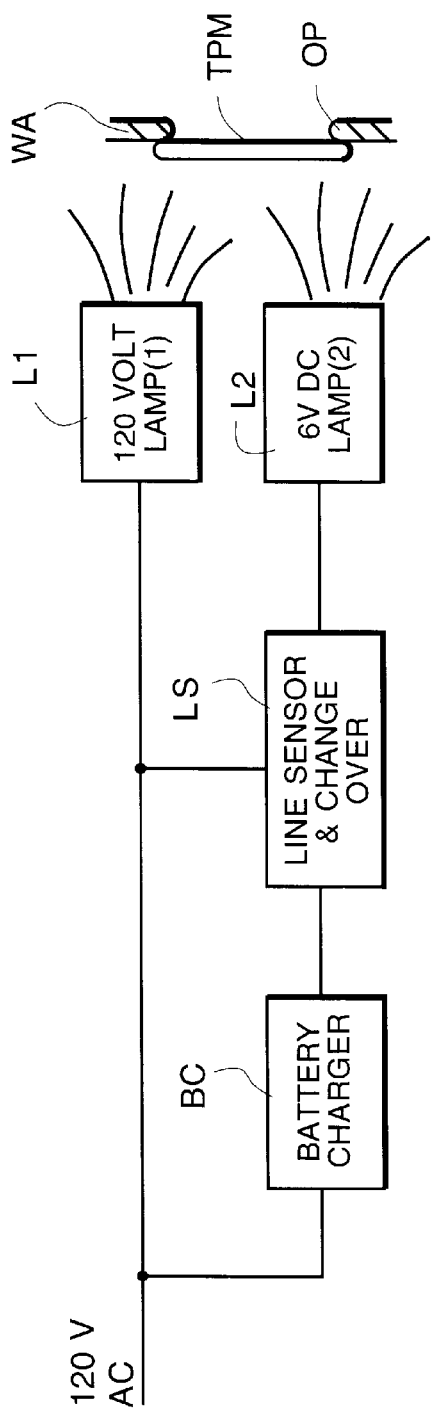
FIG. 1 is a block diagram of prior art incandescent exit signs.
Figure 2:
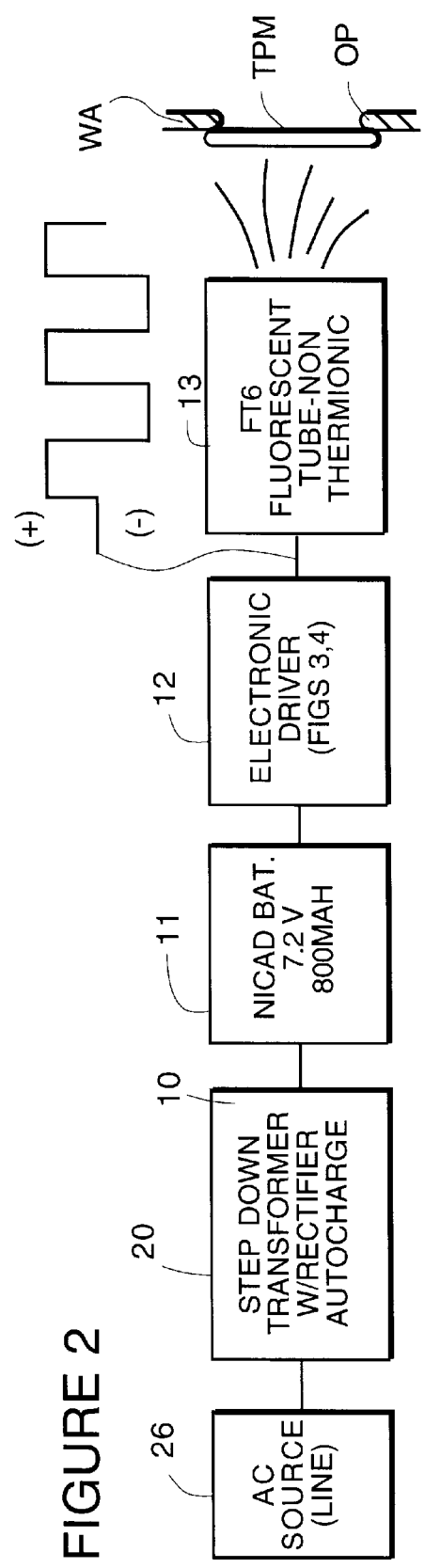
FIG. 2 is a block diagram having a driver circuit incorporating the present invention.

Referring now to FIG. 2, a step-down transformer supplies AC voltage (120V) 26 to an inverter 10 which charges battery 11 coupled to an alternating square wave driver circuit 12 which in turn supplies the high-frequency (3.9 megahertz at about 1.4 volts) alternating current square wave to fluorescent tube 13 which emits light 14. The driver circuit is shown in detail in FIG. 3. Switch 15 couples DC voltage (7.2 volts) from battery 11 to the driver circuit 13. The driver circuit includes an oscillation transformer T1 having a center tapped primary having windings P1, P2 with the center tap connected to the gate electrode of solid state switch or oscillating diode D1. The opposing ends of oscillating diode D1 are connected to the upper and lower ends of the primary windings P1, P2 of transformer T1. A filter capacitor C1 is connected across the 7.2 volt direct current input, and a filter capacitor C3 is connected to coupling resistor R1. A shunt capacitor C2 shunts the oscillating diode D1. The output to the fluorescent tube is about 1.4 volts at 3.9 megahertz open circuit and 1.7 megahertz square wave at the tube. Thus, the circuit has no ballast, no starter, no filament current source, is non-thermionic and produces more light using the conventional fluorescent lamps and because it is non-thermionic is significantly more efficient.

Figure 3:
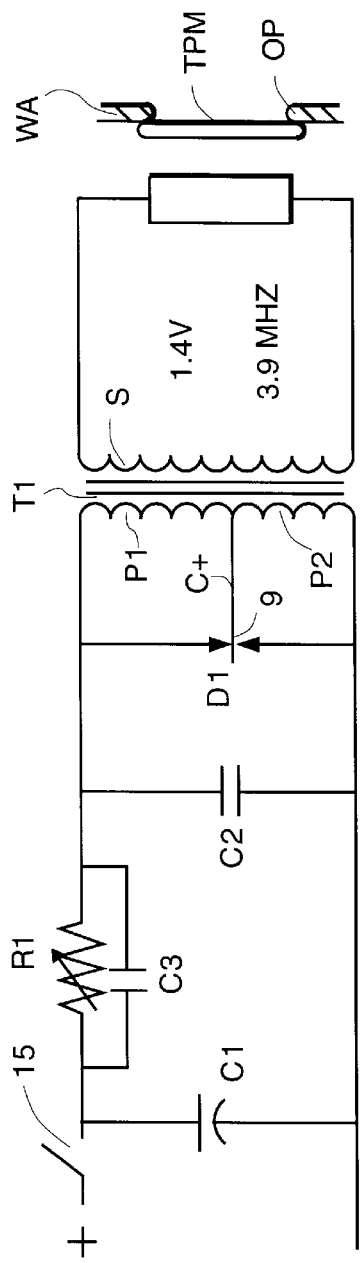
FIG. 3 is a detailed circuit diagram of the driver circuit of the present invention.

FIG. 3 illustrates a low-voltage square wave inverter circuit requiring a minimum of five components (the electrolytic filter capacitor C1 is deemed to be a part of the DC power source or supply). Switch 15 couples DC voltage (7.2 volts for example) from a battery to the low-voltage square wave inverter drive circuit resistor R1 can be a dimmer (intensity control) resistor. This driver circuit includes an oscillation transformer T1 having a center tapped CT primary winding having primary windings P1 and P2 with the center top CT connected to gate electrode G of solid state switch D1. The opposing ends of switch D1 are connected to the upper and lower ends of the primary windings P1 and P2. A capacitor C3 shunts the oscillating transistor/diode D1. The exemplary circuit components are as follow:

| | |
|---|---|
| Fluorescent tube | FT6 |
| Resistor R1 | 1500 Ohms |
| Capacitor C1 | 47UF 10 V Electrolytic |
| Transistor diode 01 | 5609/6BC/ECB |
| Capacitor 31 | 2A562K |
| Capacitor 32 | 2A22K |

The output to the fluorescent tube is about 1.4 volts RMS at 3.9 MHz open circuit and 1.7 MHz, square wave at the tube. Thus, the system has no ballast transformer, no thermionic heating of filaments, no starter circuit, and produces light in a more energy-efficient way.

Figure 4:
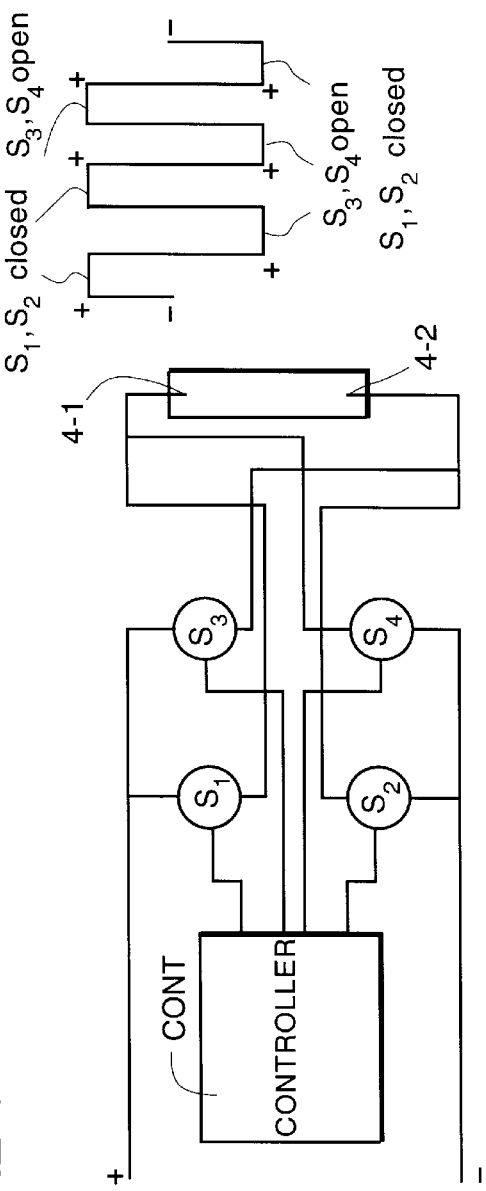
FIG. 4 is a diagrammatic illustration of a transformerless square wave inverter circuit of the present invention.

FIG. 4 diagrammatically illustrates a transformerless square wave inverter circuit. Here, the positive (+) and negative (−) terminals of a direct current source are alternately connected to opposing electrodes of the fluorescent lamp(s). In this case, when switches S1 and S2 are closed simultaneously or at the same time (preferably by the same signal from controller CONT, the positive terminal (+) is connected to electrode 4-1 and the negative terminal (−) is connected directly to electrode 4-2. When the switches S3 and S4 are simultaneously closed (and switches S1 and S4 are open) by controller CONT, the positive terminal (+) is connected directly to lamp electrode 4-2 and the negative terminal (−) is connected to fluorescent lamp electrode 4-1. Controller CONT can operate the switches in the range of about 75 kHz to about 3.9 MHz and preferably operates the switches to cause the square wave applied to lamp electrodes 4-1 and 4-2 to be at a frequency of about 100 kHz.

Figure 5:
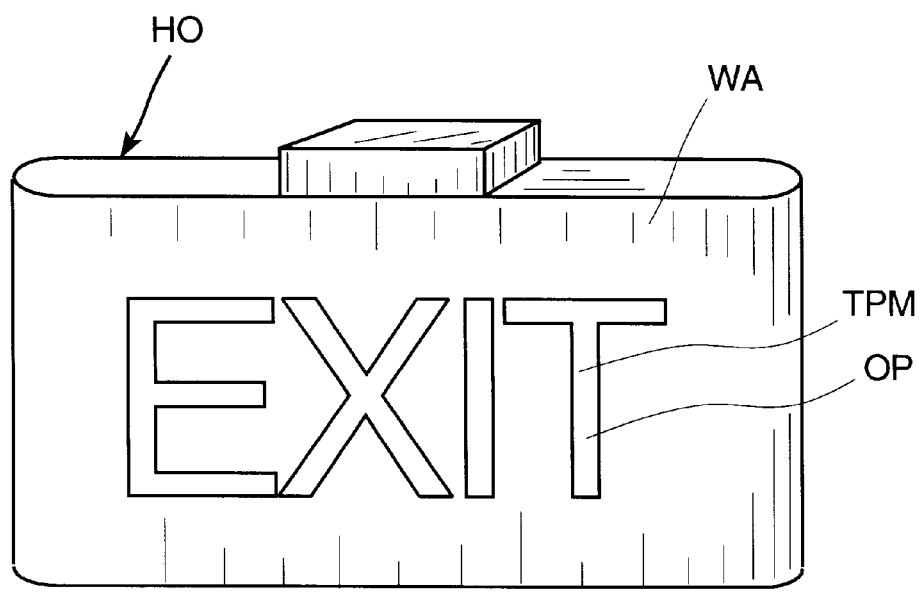
FIG. 5 is a schematic isometric view of an exit sign and housing incorporating the invention.

FIG. 5 illustrates an "exit" sign housing HO in which the word "exit" is formed in openings OP in a wall WA and a translucent panel member TPM, colored green or red, etc. so that when illuminated from inside the closed housing HO by the fluorescent lamp which has been excited by the square wave driver circuit disclosed herein. The word "exit" or other signage is illuminated.

While preferred embodiments of the invention have been shown and described, it will be appreciated that other embodiments, adaptations and modifications to the invention will be readily apparent to those skilled in the art.

I claim:

1. A sign lighting system comprising, in combination a housing having an information indicia formed in one or more walls thereof, a fluorescent gas discharge lamp means, a source of a low-voltage, high-frequency square wave voltage having a pair of output terminals and substantially LC free circuit connecting said low-voltage, high-frequency square wave voltage to said fluorescent gas discharge means to non-thermionically excite and illuminate said fluorescent gas discharge lamp means, and thereby illuminate said information indicia.

2. The sign lighting system defined in claim 1 wherein said low voltage is from about 2 volts to about 90 volts and the frequency is from about 75 kHz to about 3.5 MHz.

3. A sign having a housing with information indicia thereon, the sign having a lighting system including a fluorescent gas discharge lamp device mounted in said housing, a source of low-voltage, high-frequency, square wave AC voltage having output terminals and a substantially LC-free circuit connecting said gas discharge lamp device to said output terminals to excite and illuminate said fluorescent gas discharge lamp device to thereby illuminate said information indicia.

4. A sign as defined in claim 3 including a source of AC line current, a stepdown transformer connected to said source and having a low AC voltage output, a rectifier connected to said low AC voltage output, a rechargeable storage battery connected to said rectifier and means connecting said low voltage output to said circuit and said rechargeable battery.

5. A sign having a housing with information indicia thereon, the sign having a lighting system for illuminating said information indicia including a fluorescent gas discharge lamp device mounted in said housing, a circuit including a source of low-voltage, high-frequency, square wave alternating current voltage and means connecting said gas discharge lamp device to said circuit to excite and illuminate said fluorescent gas discharge lamp device and thereby illuminate said information indicia.

6. A sign as defined in claim 5 including a source of AC line current, a stepdown transformer connected to said source and having a low AC voltage output, a rectifier connected to said low AC voltage output, a rechargeable storage battery connected to said rectifier and means connecting said low voltage output to said circuit and said rechargeable battery.

7. A low-voltage, high-efficiency, fluorescent signage comprising a housing having walls, sign in at least one of said walls and indicia adapted to be illuminated from the rear, a fluorescent gas discharge lamp device mounted in said housing, a source of low-voltage, high-frequency, square wave AC voltage having output terminals and an LC-FREE CIRCUIT connecting said low gas discharge lamp device to said output terminals to excite said fluorescent gas discharge lamp device and illuminate said sign indicia.

* * * * *